United States Patent
Hoshi et al.

(10) Patent No.: US 12,227,082 B2
(45) Date of Patent: Feb. 18, 2025

(54) VEHICLE CONTROL SYSTEM

(71) Applicant: SUBARU CORPORATION, Tokyo (JP)

(72) Inventors: Takumi Hoshi, Tokyo (JP); Fumiyuki Moriya, Tokyo (JP); Tatsuhiro Kubo, Tokyo (JP); Shiro Ezoe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 427 days.

(21) Appl. No.: 17/225,257

(22) Filed: Apr. 8, 2021

(65) Prior Publication Data

US 2021/0316618 A1 Oct. 14, 2021

(30) Foreign Application Priority Data

Apr. 12, 2020 (JP) .................... 2020-071384

(51) Int. Cl.
| | |
|---|---|
| B60L 15/20 | (2006.01) |
| B60L 50/16 | (2019.01) |
| B60W 10/08 | (2006.01) |
| B60W 10/184 | (2012.01) |
| B60W 30/18 | (2012.01) |

(52) U.S. Cl.
CPC .......... *B60L 15/2009* (2013.01); *B60L 50/16* (2019.02); *B60W 10/08* (2013.01); *B60W 10/184* (2013.01); *B60W 30/18109* (2013.01); *B60L 2240/12* (2013.01); *B60L 2240/14* (2013.01)

(58) Field of Classification Search
CPC ..... B60L 15/2009; B60L 50/16; B60W 10/08; B60W 10/184; B60W 30/18109
See application file for complete search history.

(56) References Cited

U.S. PATENT DOCUMENTS

| | | | | |
|---|---|---|---|---|
| 2016/0023660 | A1* | 1/2016 | Yu | ........ B60W 10/184 477/203 |
| 2016/0185254 | A1 | 6/2016 | Ariyoshi et al. | |
| 2016/0221561 | A1* | 8/2016 | Leroy | ...... B60T 17/02 |

(Continued)

FOREIGN PATENT DOCUMENTS

| | | |
|---|---|---|
| JP | 2000-255399 A | 9/2000 |
| JP | 2015-13549 A | 1/2015 |
| WO | 2015/019766 A1 | 2/2015 |

*Primary Examiner* — James M McPherson
*Assistant Examiner* — Clint Pham
(74) *Attorney, Agent, or Firm* — TROUTMAN PEPPER LOCKE LLP

(57) ABSTRACT

A vehicle control system is provided with a motor generator and has a function of, if a vehicle-stop brake fluid pressure at a vehicle stop timing is less a predetermined pressure necessary for holding a vehicle in a stopped state, boosting the vehicle-stop brake fluid pressure to the stop holding fluid pressure or greater to hold the vehicle in the stopped state. The system includes a first calculator, a second calculator, and a vehicle stop controller. The first calculator calculates a target driving force for the vehicle. The second calculator calculates, from the target driving force, a requested driving force for drive control of the motor generator and a requested brake fluid pressure to be used for brake control. The vehicle stop controller performs, at a timing immediately before the vehicle stop timing, a pre-boosting process of increasing the brake fluid pressure to the stop holding fluid pressure or greater.

19 Claims, 13 Drawing Sheets

(56) References Cited

U.S. PATENT DOCUMENTS

| | | | |
|---|---|---|---|
| 2016/0304096 A1* | 10/2016 | Khafagy | B60W 30/18118 |
| 2017/0144640 A1* | 5/2017 | Hattori | B60T 17/02 |
| 2018/0126965 A1* | 5/2018 | Tsuji | B60T 8/245 |
| 2018/0141540 A1* | 5/2018 | Kumazaki | B60K 6/48 |
| 2018/0222459 A1* | 8/2018 | Kelly | B60T 8/00 |
| 2019/0061719 A1* | 2/2019 | Higashi | B60T 8/00 |
| 2019/0270383 A1* | 9/2019 | Murakami | B60L 50/16 |
| 2019/0276025 A1* | 9/2019 | Asano | B60W 10/04 |

* cited by examiner

VEHICLE CONTROL SYSTEM

CROSS-REFERENCE TO RELATED APPLICATIONS

The present application claims priority from Japanese Patent Application No. 2020-071384 filed on Apr. 12, 2020, the entire contents of which are hereby incorporated by reference.

BACKGROUND

The technology relates to a vehicle control system in a vehicle having a stop holding function for holding of the vehicle in a stopped state. For example, the technology relates to control of a brake fluid pressure at a time when a vehicle makes a stop.

A vehicle having a stop holding function of holding the stopped vehicle in a stopped state has been known. Such a stop holding function is exerted, for example, when the vehicle is stopped by a vehicle speed control function, known as adaptive cruise control (ACC), to follow a preceding vehicle, or when the vehicle is stopped by a one-pedal function. The one-pedal function refers to a function of causing a vehicle to accelerate and decelerate on the basis of operations performed on one pedal.

The stop holding function sometimes necessitates a brake fluid pressure higher than a brake fluid pressure necessary for stopping, due to constraints of a mechanism that holds the brake fluid pressure, for example. In such cases, the fluid pressure may be boosted from the fluid pressure at a time of stopping to a fluid pressure that enables the stop holding function.

For related techniques, reference may be made to International Publication WO2015/019766 and Japanese Unexamined Patent Application Publication Nos. 2015-013549 and 2000-255399.

SUMMARY

An aspect of the technology provides a vehicle control system for a vehicle. The vehicle is provided with a motor generator as a wheel drive source and has a stop holding function of, in a case where a vehicle-stop brake fluid pressure that is a brake fluid pressure at a vehicle stop timing is not equal to or greater than a predetermined stop holding fluid pressure that is a brake fluid pressure necessary for holding of the vehicle in a stopped state, boosting the vehicle-stop brake fluid pressure to the stop holding fluid pressure or greater to hold the vehicle in stopped state. The vehicle control system includes a first calculator, a second calculator, and a vehicle stop controller. The first calculator is configured to calculate a target driving force for the vehicle. The second calculator is configured to calculate, on the basis of the target driving force, a requested driving force to be used for drive control of the motor generator and a requested brake fluid pressure to be used for brake control. The vehicle stop controller is configured to perform, at an immediately-before-vehicle-stop timing that is a timing immediately before the vehicle stop timing, a pre-boosting process of increasing the brake fluid pressure to the stop holding fluid pressure or greater.

An aspect of the technology provides a vehicle control system for a vehicle. The vehicle is provided with a motor generator as a wheel drive source and has a stop holding function of, in a case where a vehicle-stop brake fluid pressure that is a brake fluid pressure at a vehicle stop timing is not equal to or greater than a predetermined stop holding fluid pressure that is a brake fluid pressure necessary for holding the vehicle in a stopped state, boosting the vehicle-stop brake fluid pressure to the stop holding fluid pressure or greater to hold the vehicle in stopped state. The vehicle control system includes circuitry. The circuitry is configured to calculate a target driving force for the vehicle. The circuitry is further configured to calculate, on the basis of the target driving force, a requested driving force to be used for drive control of the motor generator and a requested brake fluid pressure to be used for brake control. The circuitry is further configured to perform, at an immediately-before-vehicle-stop timing that is a timing immediately before the vehicle stop timing, a pre-boosting process of increasing the brake fluid pressure to the stop holding fluid pressure or greater.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
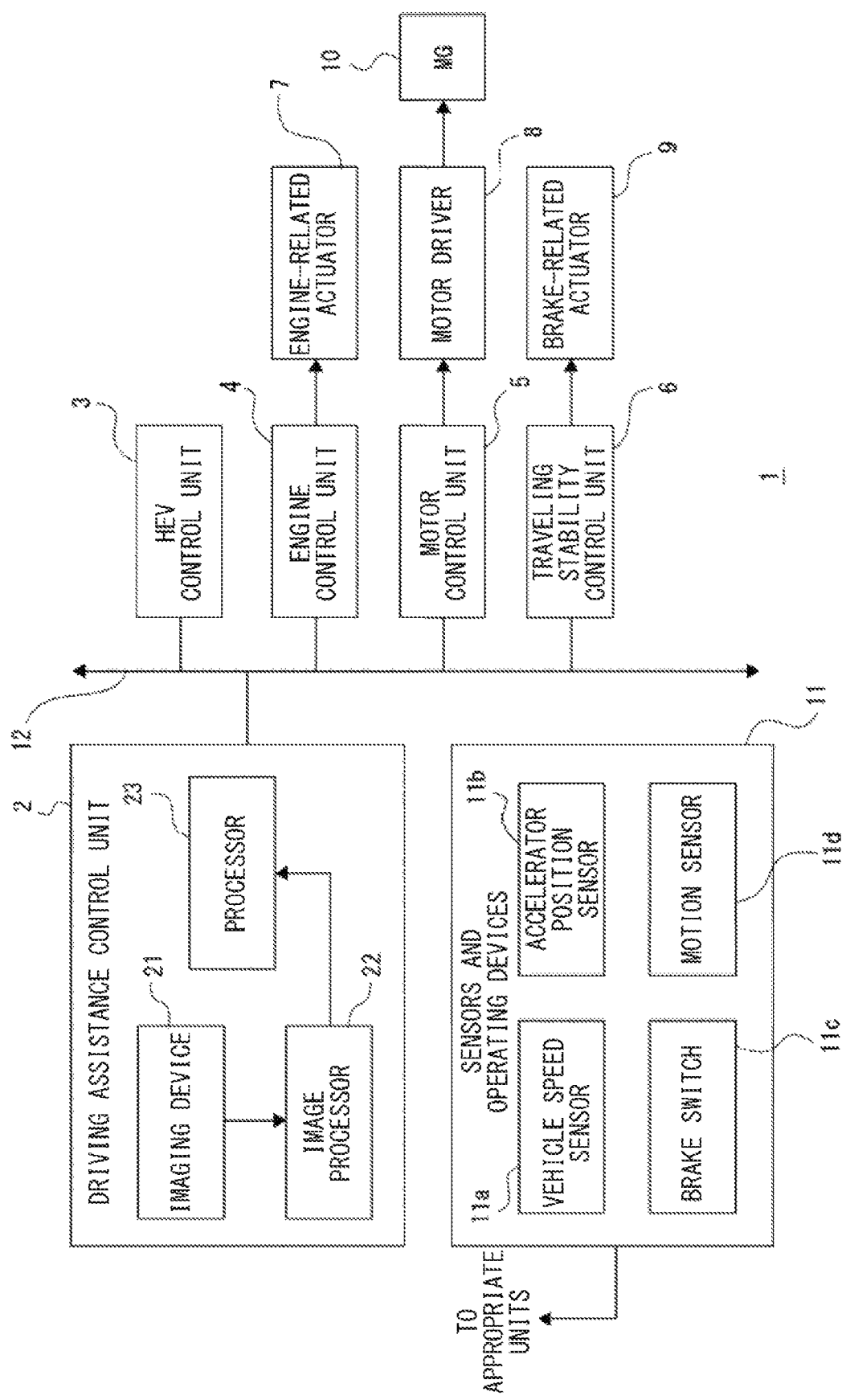
FIG. 1 is a block diagram illustrating an outline configuration of a vehicle control system according to one example embodiment of the technology.

In recent years, electrically controlled boosters have become widely used to control a brake fluid pressure, in place of vacuum boosters. In a case of using an electrically controlled booster to boost the brake fluid pressure at a time when a vehicle stops, as described above, a motor produces operating sound, and the operating sound can give a user a feeling of strangeness.

Boosting of the brake fluid pressure for stop holding is performed forcedly when the vehicle stops, which can make a vehicle exhibit an unnatural behavior in stopping and give the user a feeling of strangeness also in this point.

It is desirable to reduce a user's feeling of strangeness in achieving stop holding.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

FIG. 1 is a block diagram illustrating an outline configuration of a vehicle control system 1 according to an example embodiment of the technology. FIG. 1 mainly illustrates only a configuration of a part related to the example embodiment of the technology, extracted from the configuration of the vehicle control system 1. The example embodiment describes, as an example, a case where the technology is applied to a hybrid electric vehicle (HEV).

As illustrated in FIG. 1, the vehicle control system 1 may include a driving assistance control unit 2, an HEV control unit 3, an engine control unit 4, a motor control unit 5, a traveling stability control unit 6, an engine-related actuator 7, a motor driver 8, a brake-related actuator 9, a motor generator (MG) 10, sensors and operating devices 11, and a bus 12.

The driving assistance control unit 2 may include an imaging device 21, an image processor 22, and a processor 23. The driving assistance control unit 2 may execute various control processes for driving assistance (hereinafter referred to as a "driving assistance control process").

The imaging device 21 may obtain captured image data by capturing an image in a traveling direction of the own vehicle (a forward direction in this example). The imaging device 21 in this example may include two cameras. Each camera may include a camera optical system and an image sensor such as a charge coupled device (CCD) or a complementary metal oxide semiconductor (CMOS). Each camera may cause the camera optical system to form a subject image on an imaging plane of the image sensor, and acquire, in units of pixels, an electrical signal corresponding to an amount of received light. Each camera may be installed to be able to measure distances by a so-called stereo imaging method. The electrical signal obtained by each camera may be subjected to A/D conversion and a predetermined correction process, and may be supplied to the image processor 22 as a digital image signal (captured image data) that indicates, in units of pixels, a luminance value corresponding to a predetermined gray-scale.

The image processor 22 may be configured by a microcomputer including a central processing unit (CPU), a read only memory (ROM), and a random access memory (RAM), for example, or by a digital signal processor (DSP). The image processor 22 may execute, on the basis of the captured image data obtained by the imaging device 21, predetermined image processing related to recognition of an environment outside the vehicle.

In one example, the image processor 22 may execute various kinds of image processing based on the pieces of captured image data obtained by the stereo imaging, recognize information such as data on a three-dimensional object and a lane line in front of the own vehicle, and estimate a road on which the own vehicle travels (hereinafter referred to as an "own vehicle traveling road") on the basis of such recognized information. The image processor 22 may also detect a preceding vehicle on the own vehicle traveling road on the basis of the recognized three-dimensional object data, for example.

In one example, the image processor 22 may perform the following process, for example, as a process based on the pieces of captured image data obtained by the stereo imaging. First, the image processor 22 may generate distance information on the basis of an amount of shift (i.e., parallax) between corresponding positions of a captured image pair serving as the pieces of captured image data, on the basis of the principle of triangulation. The image processor 22 may perform known grouping on the distance information, and compare the grouped distance information with pre-stored three-dimensional data such as road shape data or three-dimensional object data. The image processor 22 may thereby extract lane line data, data on a sidewall, such as a guardrail or a curb, present along a road, and data on a three-dimensional object such as a vehicle, for example. The image processor 22 may also estimate the own vehicle traveling road on the basis of the lane line data and the sidewall data, for example. The image processor 22 may extract (detect), as a preceding vehicle, a three-dimensional object that is present on the own vehicle traveling road and moves at a predetermined speed (e.g., 0 km/h or greater) in substantially the same direction as the own vehicle. In a case where a preceding vehicle is detected, the image processor 22 may calculate, as relevant preceding vehicle information, an inter-vehicle distance cd (=an inter-vehicle distance from the own vehicle), a relative speed ds (=a rate of change of the inter-vehicle distance cd), a preceding vehicle speed ss (the relative speed ds+an own vehicle speed js), and a preceding vehicle acceleration rate sac (=a derivative value of the preceding vehicle speed ss). Note that the own vehicle speed js may be a traveling speed of the own vehicle to be detected by a vehicle speed sensor 11a described later. The own vehicle speed js may be referred to as an "actual vehicle speed" as contrasted with a set vehicle speed St described later. In addition, the image processor 22 may recognize, out of preceding vehicles, a preceding vehicle whose preceding vehicle speed ss is a predetermined value or less (e.g., 4 km/h or less) and is not accelerating, as a preceding vehicle in a substantially stopped state.

The image processor 22 may calculate the preceding vehicle information for each frame of the captured image data, and sequentially store the calculated preceding vehicle information.

The processor 23 may be configured by a microcomputer including a CPU, a ROM, and a RAM, for example. The processor 23 may execute the driving assistance control process, on the basis of a result of the image processing performed by the image processor 22 and detection information and operation input information obtained by the sensors and operating devices 11.

The processor 23 may be coupled, via the bus 12, to the HEV control unit 3, the engine control unit 4, the motor control unit 5, and the traveling stability control unit 6 that are configured by microcomputers as well, to be able to perform data communication mutually with these control units. The processor 23 may instruct an appropriate control unit out of the control units to execute operation related to the driving assistance.

The processor 23 may perform automatic cruise control as an example of the driving assistance control process. In other words, the processor 23 may control the speed of the own vehicle to satisfy designated traveling conditions. For example, the processor 23 in this example may perform, as the automatic cruise control, a process for implementation of adaptive cruise control (ACC).

In the ACC, a target vehicle speed St and a target inter-vehicle distance Dt may be set on the basis of an operation input inputted by a predetermined operating device provided in the sensors and operating devices 11. In this example, a driver may be allowed to perform an operation to select any inter-vehicle distance mode from, for example, three inter-vehicle distance modes of "long", "middle", and "short". The processor 23 may, for example, set a different target inter-vehicle distance Dt for each selected mode, on the basis of the own vehicle speed js.

Hereinafter, the "target vehicle speed St" may be referred to as the "set vehicle speed St".

During the ACC, the processor 23 may perform, in a case where a preceding vehicle is not detected, constant-speed travel control of causing the own vehicle speed js to converge to the set vehicle speed St.

In a case where a preceding vehicle is recognized during the constant-speed travel control, the processor 23 may perform following travel control of causing the inter-vehicle distance cd to the preceding vehicle to converge to the target inter-vehicle distance Dt. Such following travel control may also be referred to as "preceding-vehicle-following vehicle speed control". The processor 23 in this example may perform, as such following travel control, control of causing the vehicle to make a stop following the preceding vehicle and make a start following the preceding vehicle. For example, the processor 23 may perform control of causing the own vehicle to make a stop in response to stop of the preceding vehicle, and to follow the preceding vehicle in a case where the preceding vehicle thereafter makes a start.

During the ACC, the processor 23 may calculate a target driving force for implementation of the constant-speed travel control and the above-described following travel control.

In a state other than during the ACC, the processor 23 may calculate the target driving force on the basis of an accelerator operation and a brake operation performed by the driver. The state other than during the ACC may be a state in which acceleration and deceleration of the vehicle is controlled on the basis of the accelerator operation and the brake operation performed by the driver.

The target driving force may be calculated as a value whose polarity differs between on an acceleration side and on a deceleration side, such as a positive value on the acceleration side and a negative value on the deceleration side.

The processor 23 in this example may calculate a requested driving force and a requested brake fluid pressure, on the basis of the calculated target driving force. The requested driving force may be a vehicle driving force requested to achieve the target driving force. In a case of the vehicle including an engine and the MG 10 as wheel drive sources in this example, the requested driving force may be calculated as a total driving force of the engine and the MG 10.

The requested brake fluid pressure may be a brake fluid pressure requested to achieve the target driving force.

In a case of an HEV, braking of the vehicle may be performed by a regenerative brake using regeneration by the MG 10, as well as a brake mechanism including a disc brake, for example. Therefore, when the vehicle decelerates, the requested driving force may be calculated as well as the requested brake fluid pressure, to achieve a deceleration state corresponding to the calculated target driving force.

The processor 23 in this example may also perform a process for implementation of a stop holding function. The stop holding function may be a function of holding the stopped vehicle in a stopped state. In one example, the stop holding function may be a function of, in a case where a vehicle-stop brake fluid pressure that is a brake fluid pressure at a vehicle stop timing is not equal to or greater than a predetermined fluid pressure, performing stop holding by increasing the brake fluid pressure to the predetermined fluid pressure or greater.

The stop holding function will be described in detail later.

The sensors and operating devices 11 may comprehensively represent various sensors and operating devices provided in the own vehicle. The sensors included in the sensors and operating devices 11 may include the vehicle speed sensor 11a that detects the speed of the own vehicle as the own vehicle speed js, an accelerator position sensor 11b that detects an accelerator position from an amount of depression of an accelerator pedal, a brake switch 11c to be turned ON/OFF depending on whether a brake pedal is operated or not operated, and a motion sensor 11d that includes an acceleration rate sensor and an angular speed sensor, for example, and detects a motion of the own vehicle.

Although not illustrated, the sensors and operating devices 11 may also include, as other sensors, an engine speed sensor that detects an engine speed, an intake air amount sensor that detects an amount of intake air to the engine, a throttle position sensor that detects a position of a throttle valve that is provided in an intake passage to adjust an amount of intake air to be supplied to each cylinder of the engine, a water temperature sensor that detects a cooling water temperature indicating an engine temperature, an outside temperature sensor that detects a temperature outside the vehicle, and a gradient sensor that detects a gradient of the own vehicle traveling road, for example.

The operating devices may include a start switch to be used for giving an instruction for start/stop of the vehicle control system 1 and the operating device to be used for the ACC-related operation described above, for example.

The HEV control unit 3 may instruct the engine control unit 4 and the motor control unit 5 to control operation of the vehicle, on the basis of the requested driving force calculated by the processor 23 in the driving assistance control unit 2.

On the basis of the requested driving force inputted from the processor 23, the HEV control unit 3 may calculate engine requested driving force that is a driving force requested of the engine and motor requested driving force that is a driving force requested of the MG 10. The HEV control unit 3 may designate the engine requested driving force for the engine control unit 4, and designate the motor requested driving force for the motor control unit 5.

The engine control unit 4 may control various actuators provided as the engine-related actuator 7, on the basis of the engine requested driving force designated by the HEV control unit 3. The engine-related actuator 7 may include, for example, various actuators related to drive of the engine, such as a throttle actuator that drives a throttle valve or an injector that injects fuel.

The engine control unit 4 may control output of the engine by controlling fuel injection timing, a fuel injection pulse width, and a throttle position, for example, on the basis of the engine requested driving force. The engine control unit 4 may also be configured to control start/stop of the engine.

The motor control unit 5 may control operation of the MG 10, by controlling the motor driver 8 on the basis of the motor requested driving force designated by the HEV control unit 3. The motor driver 8 may be configured as an electric circuit including a drive circuit of the MG 10.

On the basis of the motor requested driving force, the motor control unit 5 may instruct the motor driver 8 to rotate the MG 10 for power running in a case where the MG 10 is to be rotated for power running, and instruct the motor driver 8 to rotate the MG 10 for regeneration in a case where the MG 10 is to be rotated for regeneration.

Although not illustrated, the vehicle control system 1 may be provided with a traveling battery serving as a power source of the MG 10. The traveling battery may be used for the vehicle to travel. The traveling battery may be charged on the basis of electric power generated by the MG 10 by regenerative rotation.

The traveling stability control unit 6 may be a control unit that performs control related to traveling stability of the vehicle, such as vehicle dynamics control (VDC). The traveling stability control unit 6 may perform brake control as an example of the control related to the traveling stability of the vehicle. As the brake control, the traveling stability control unit 6 may control actuators provided as the brake-related actuator 9, on the basis of the requested brake fluid pressure designated by the processor 23. The brake-related actuator 9 may include, for example, various actuators related to braking, such as a fluid pressure control actuator that controls an output fluid pressure from a brake booster to a master cylinder or a fluid pressure in a brake fluid pipe. In one example, the traveling stability control unit 6 may control the fluid pressure control actuator to brake the own vehicle, on the basis of the requested brake fluid pressure.

Figure 2:
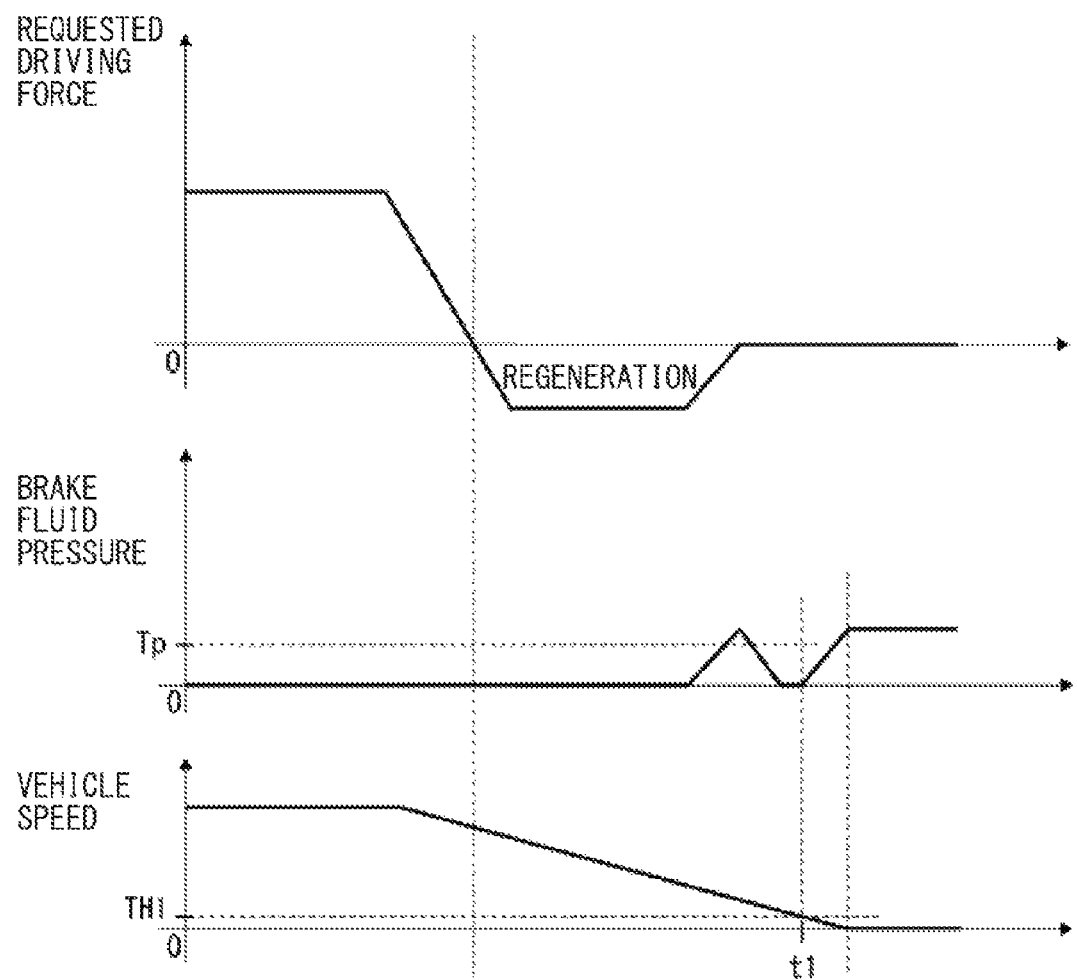
FIG. 2 is an explanatory diagram illustrating a stop holding function according to one example embodiment.

FIG. 2 is an explanatory diagram illustrating the stop holding function. FIG. 2 illustrates, as an example, progression of the requested driving force, the brake fluid pressure, and the vehicle speed (the own vehicle speed js) until the vehicle is held in a stopped state after deceleration during the ACC. As illustrated in FIG. 2, described here is an example in which the deceleration is performed from a constant-speed traveling state.

At a given timing after the deceleration is started from the constant-speed traveling state, the requested driving force may turn from a positive value to a negative value and the MG 10 may perform regenerative rotation (regenerative braking). As illustrated in FIG. 2, the regenerative braking may not be performed continuously until the vehicle stops. For example, at a timing when the vehicle speed becomes a given value or less, the requested driving force may be gradually increased toward 0, whereas the brake fluid pressure may be gradually increased and braking may be switched to braking by the brake mechanism.

When the vehicle is about to stop, the increased brake fluid pressure may be gradually reduced. This reduction may be for shock dampening at a time when the vehicle stops.

Note that the illustrated degree of reduction in the brake fluid pressure is a mere example. The brake fluid pressure may not necessarily be made 0 as illustrated in FIG. 2, as long as the brake fluid pressure is reduced enough for shock dampening at the time when the vehicle stops. The degree of reduction in the brake fluid pressure may be set as appropriate on the basis of specifications (e.g., a coefficient of air resistance and weight) of the vehicle and a road surface situation (e.g., a gradient).

As described above, the stop holding function may be a function of, in a case where the vehicle-stop brake fluid pressure that is the brake fluid pressure at the vehicle stop timing is not equal to or greater than the predetermined fluid pressure (hereinafter referred to as a "stop holding fluid pressure Tp"), performing stop holding by increasing the brake fluid pressure to the stop holding fluid pressure Tp or greater.

The stop holding fluid pressure Tp may be defined as a brake fluid pressure necessary for holding of the vehicle in a stopped state. The stop holding fluid pressure Tp may be defined as a limit value (lower limit) of the brake fluid pressure for holding of the vehicle in a stopped state, or may be defined as a value (the limit value+α) including a margin in addition to the limit value.

In the stop holding function in this example, in a case where the vehicle-stop brake fluid pressure is equal to or greater than the stop holding fluid pressure Tp, the brake fluid pressure may be kept at the vehicle-stop brake fluid pressure.

In this example, a first threshold TH1 related to the vehicle speed may be defined as a condition in determining whether the vehicle stop timing has arrived. In this example, it may be determined that the vehicle stop timing has arrived in a case where the vehicle speed is the first threshold TH1 or less. The first threshold TH1 is not limited to a threshold for strictly determination of a timing at which the vehicle speed becomes 0 km/h. The first threshold TH1 may be set to enable determination of a timing at which the vehicle reaches a state that may be regarded as stopped. As an example, the first threshold TH1 may be set as a value within a range of 0 km/h to 1 km/h. In this example, it may be assumed that the first threshold TH1=0.5 km/h is set.

In FIG. 2, the vehicle stop timing may be indicated as time t1.

Illustrated as an example is a case where the vehicle-stop brake fluid pressure is less than the stop holding fluid pressure Tp. In this case, the brake fluid pressure may be boosted to the stop holding fluid pressure Tp or greater by the stop holding function, and the vehicle may be held in a stopped state by the boosted brake fluid pressure.

In this example, processes for implementation of the stop holding function described above may be executed by the traveling stability control unit 6, for example. In one example, the processes for implementation of the stop holding function may include determination as to whether the vehicle stop timing has arrived, determination as to necessity for pressure boosting based on the stop holding fluid pressure Tp, and the brake fluid pressure boosting control performed in a case where the brake fluid pressure is to be boosted.

Now, vehicle stop control according to the example embodiment will be described.

Figure 3:
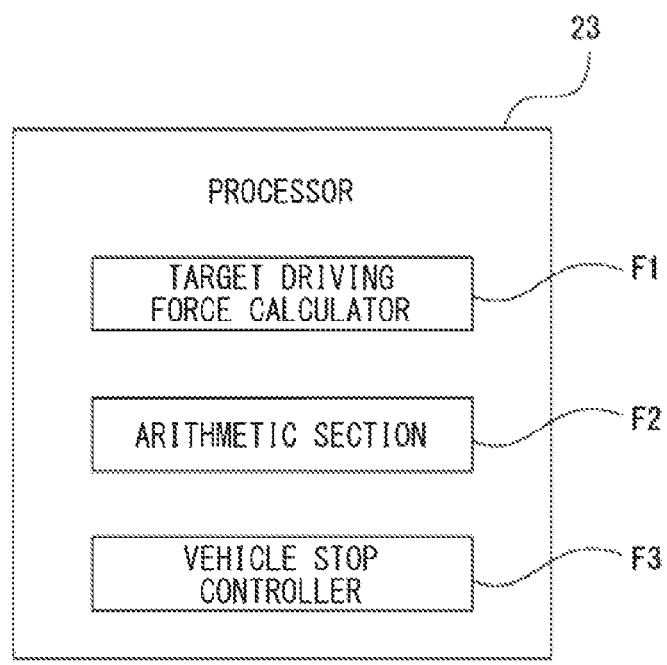
FIG. 3 is a block diagram related to vehicle stop control according to one example embodiment.

FIG. 3 is a block diagram related to the vehicle stop control according to the example embodiment. FIG. 3 illustrates, as blocks, units related to the vehicle stop control and included in the processor 23 of the driving assistance control unit 2.

As illustrated in FIG. 3, the processor 23 may include a target driving force calculator F1, an arithmetic section F2, and a vehicle stop controller F3.

The target driving force calculator F1 calculates the target driving force described above.

The arithmetic section F2 calculates, on the basis of the target driving force, the requested driving force to be used for drive control of the MG 10 and the requested brake fluid pressure to be used for brake control.

In one embodiment, the target driving force calculator F1 may server as a "first calculator", and the arithmetic section F2 may server as a "second calculator".

At an immediately-before-vehicle-stop timing that is a timing immediately before the vehicle stop timing described above, the vehicle stop controller F3 performs a pre-boosting process of increasing the brake fluid pressure to the stop holding fluid pressure Tp or greater.

An example of the pre-boosting process will be described with reference to FIGS. 4A and 4B.

Figure 4A:
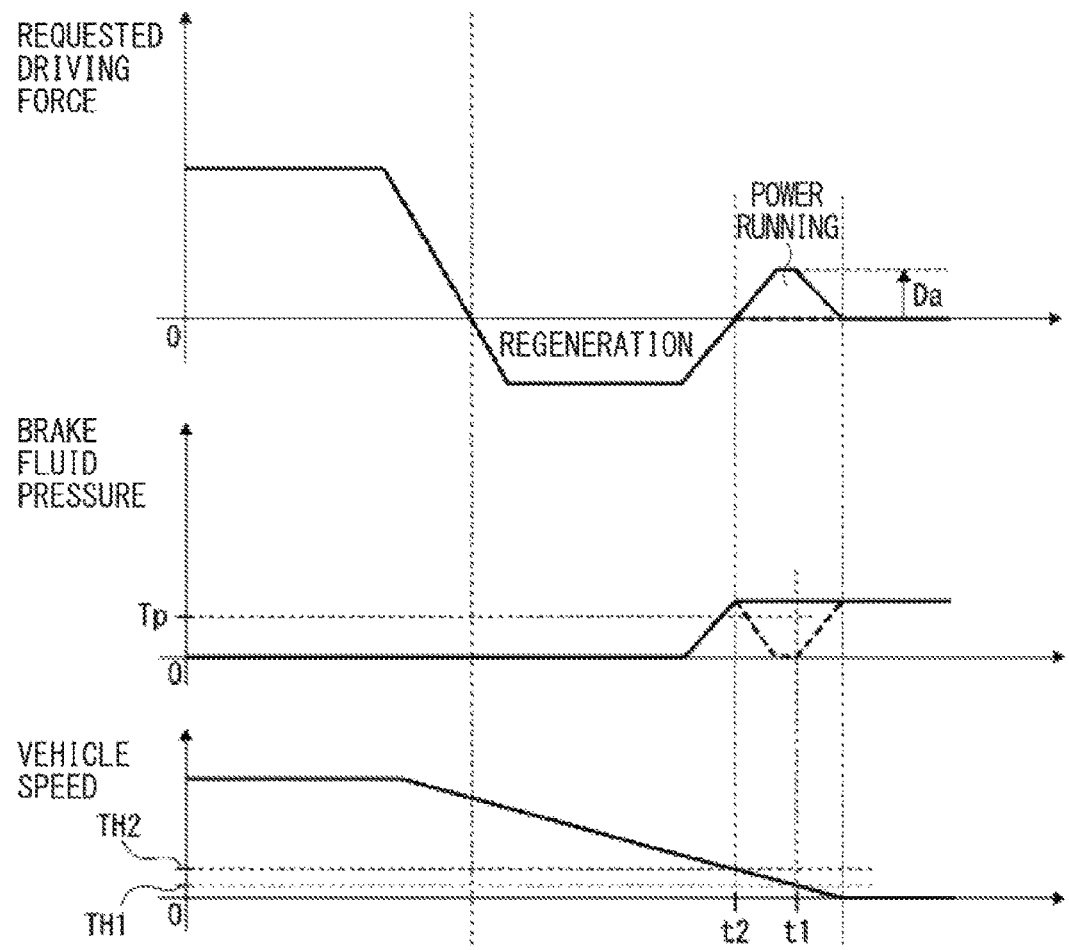
FIGS. 4A and 4B are explanatory diagrams illustrating an example of a pre-boosting process according to one example embodiment.

As with FIG. 2, FIG. 4A illustrates, as an example, progression of the requested driving force, the brake fluid pressure, and the vehicle speed until the vehicle is held in a stopped state after deceleration during the ACC. For reference, progression of the requested driving force and the brake fluid pressure in a case of not performing the pre-boosting process may be indicated by dashed lines.

In the pre-boosting process, at the immediately-before-vehicle-stop timing (time t2 in FIG. 4A) that is the timing immediately before the vehicle stop timing (indicated as time t1 also in this case), the brake fluid pressure may be increased to the stop holding fluid pressure Tp or greater by changing the value of the requested brake fluid pressure.

In this example, whether the immediately-before-vehicle-stop timing has arrived may be determined by determining whether the accelerator is off and the vehicle speed is a second threshold TH2 or less. Here, "the second threshold TH2>the first threshold TH1" may be satisfied. For example, the second threshold TH2 may be set as a value within a range of 2 km/h to 10 km/h.

In a state during deceleration toward a stop, in response to increasing the requested brake fluid pressure as described above, the value of the requested driving force may be increased accordingly for agreement with the target driving force. If only the requested brake fluid pressure is increased, the deceleration may be performed more than necessary in a period from the immediately-before-vehicle-stop timing to the vehicle stop timing, which makes it difficult to cause the vehicle to stop at an appropriate position. Therefore, in increasing the requested brake fluid pressure as the pre-boosting process, the requested driving force is to be increased to cancel out the amount of increase in the requested brake fluid pressure.

In FIG. 4A, the thus increased requested driving force, i.e., the requested driving force that has been increased to cancel out the amount of increase in the brake fluid pressure by the pre-boosting process, may be denoted by "Da".

Hereinafter, the requested driving force Da may be referred to as an "increased driving force Da".

The increased driving force Da may be expressed as "a requested driving force canceling out a brake fluid pressure Tt2+a requested driving force Dt2", where the "brake fluid pressure Tt2" is the brake fluid pressure increased by the pre-boosting process, and the "requested driving force Dt2" is the requested driving force at the immediately-before-vehicle-stop timing, when the pre-boosting process is performed.

If pressure boosting based on the stop holding function is performed at the vehicle stop timing, a driving force of the fluid pressure control actuator (e.g., a motor) can increase when the vehicle stops. This makes operating sound likely to be perceived by a user (occupant), and the operating sound can give the user a feeling of strangeness. In a case where the pre-boosting process described above is performed, as indicated by the progression of the brake fluid pressure in FIG. 4A, it is possible to prevent the driving force of the fluid pressure control actuator from increasing when the vehicle stops (at time t1), which makes it possible to make the operating sound less likely to be perceived. This helps to reduce the user's feeling of strangeness due to the operating sound of the fluid pressure control actuator.

If pressure boosting based on the stop holding function is performed, the vehicle exhibits an unnatural behavior in stopping, which can give the user a feeling of strangeness. Performing the pre-boosting process makes it possible to also reduce the user's feeling of strangeness in terms of the behavior of the vehicle.

In this example, it is assumed that the increased driving force Da is covered by the power running of the MG 10. In some cases, however, the increased driving force Da is not coverable by only the MG 10, due to an influence of shortage of a remaining amount of the traveling battery, for example.

Figure 4B:
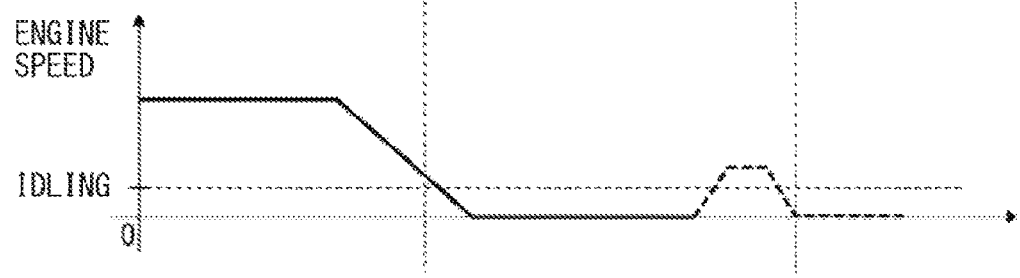

In a case where the increased driving force Da is not coverable by only the MG 10, the driving force of the engine may be used as indicated by a dashed line in FIG. 4B.

In a situation where the vehicle is decelerating toward a stop, the target driving force (requested driving force) may gradually decrease, and necessary engine driving force may also gradually decrease to become zero at a given timing. Therefore, the engine may normally be stopped at a given timing before the vehicle stops.

Because the engine may thus be stopped at a given timing before the vehicle stops, it may be necessary to restart the engine at a timing when the vehicle is about to stop in a case where the driving force of the engine is to be used to cover the increased driving force Da as described above.

Hence, in this example, at a timing prior to the immediately-before-vehicle-stop timing (time t2), it may be predicted whether the requested driving force to be increased by the pre-boosting process (i.e., the increased driving force Da) is coverable by the MG 10. In a case where it is predicted that the increased driving force Da is not coverable, control may be performed to disable the stop of the engine.

Figure 5:
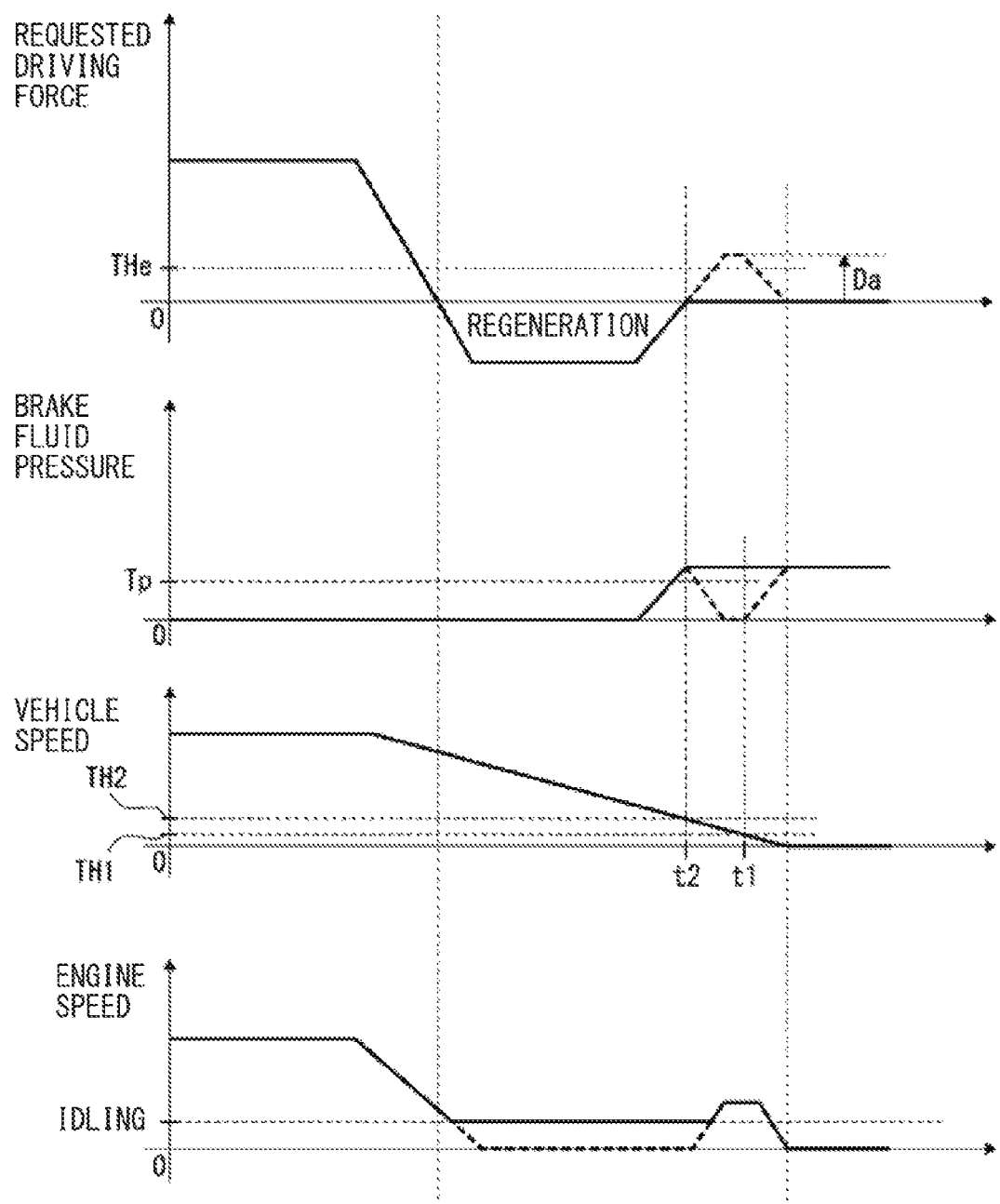
FIG. 5 is an explanatory diagram illustrating engine restart prevention control according to one example embodiment.

FIG. 5 is an explanatory diagram illustrating such engine restart prevention control.

As the engine restart prevention control, the vehicle stop controller F3 may first estimate the increased driving force Da at a timing prior to the immediately-before-vehicle-stop timing, in one example, a timing when the accelerator is off and the vehicle speed becomes a third threshold TH3 or less. The vehicle stop controller F3 may then predict whether the increased driving force Da is coverable by the MG 10. Here, "the third threshold TH3>the second threshold TH2" may be satisfied.

In this example, whether the increased driving force Da is coverable by the MG 10 may be determined on the basis of an amount of regeneration by regenerative running performed before the vehicle stops. In one example, first, a power-runnability threshold THe may be calculated on the basis of the amount of regeneration and the remaining amount (charging rate) of the traveling battery. The power-runnability threshold THe may be a threshold for the requested driving force, and may be an estimate of the requested driving force coverable by the MG 10 at a point in time when the pre-boosting process is started. In calculating the power-runnability threshold THe, the amount of regeneration of the MG 10 caused by the regenerative running performed before the vehicle stops may be estimated. On the basis of the estimated amount of regeneration, the remaining amount of the traveling battery at the point in time when the pre-boosting process is started may be estimated. Then, the requested driving force corresponding to an amount of power running of the MG 10 generatable by the thus estimated remaining amount of the traveling battery may be obtained as the power-runnability threshold THe.

The power-runnability threshold THe may be calculated more precisely by being determined on the basis of battery output and output of the MG 10. The battery output may be improved in precision by factoring in a temperature and a degree of deterioration of the traveling battery, in addition to the remaining amount (charging rate) of the traveling battery. The output of the MG 10 may be improved in precision by factoring in a temperature of an inverter of the MG 10.

The vehicle stop controller F3 may estimate the increased driving force Da, as well as calculating the power-runnability threshold THe. In this example, the increased driving force Da may be estimated by using a profile of the target driving force. During the ACC, the profile of the target driving force from the current vehicle speed to a stop may be defined at a point in time when it is determined that another vehicle is stopped in front of the vehicle. From this profile, the increased driving force Da in a case where the pre-boosting process is performed at time t2 may be estimated. In one example, to the target driving force at time t2 estimated from the profile, the brake fluid pressure (=the stop holding fluid pressure Tp) set in the pre-boosting process may be added. The resulting value may be obtained as an estimate of the increased driving force Da. The vehicle speed=the second threshold TH2 may be satisfied at time T2. The brake fluid pressure may be assumed to be a positive value. The target driving force at time t2 may be a negative value because the vehicle is decelerating. For example, in a case where the requested driving force is 0 and the brake fluid pressure is 20 to achieve −20 as the target driving force at time t2 estimated from the profile, "10" may be calculated as the increased driving force Da if the stop holding fluid pressure Tp is 30. In other words, the increased driving force Da=10 and the brake fluid pressure=30 may be satisfied to achieve the target driving force=−20.

The vehicle stop controller F3 may obtain the power-runnability threshold THe and the increased driving force Da, and thereafter predict whether the increased driving force Da exceeds the power-runnability threshold THe. In a case where the increased driving force Da exceeds the power-runnability threshold THe, the increased driving force Da is not coverable by only the MG 10. In that case, the vehicle stop controller F3 may perform control to disable the stop of the engine.

Performing the engine stop disable control described above enables the engine to be kept in an ON state as indicated by the engine speed in FIG. 5, though the engine originally is to be stopped in the course of the requested driving force decreasing toward a stop of the vehicle (see a dashed line in FIG. 5).

Therefore, in a case where the requested driving force to be increased by the pre-boosting process is not coverable by the MG 10, it is possible to prevent the engine from being restarted after being stopped when the vehicle is about to stop.

With reference to flowcharts of FIG. 6 and FIG. 7, description will be given on examples of detailed process procedures to be executed to implement the vehicle stop control according to the example embodiment described above.

Figure 6:
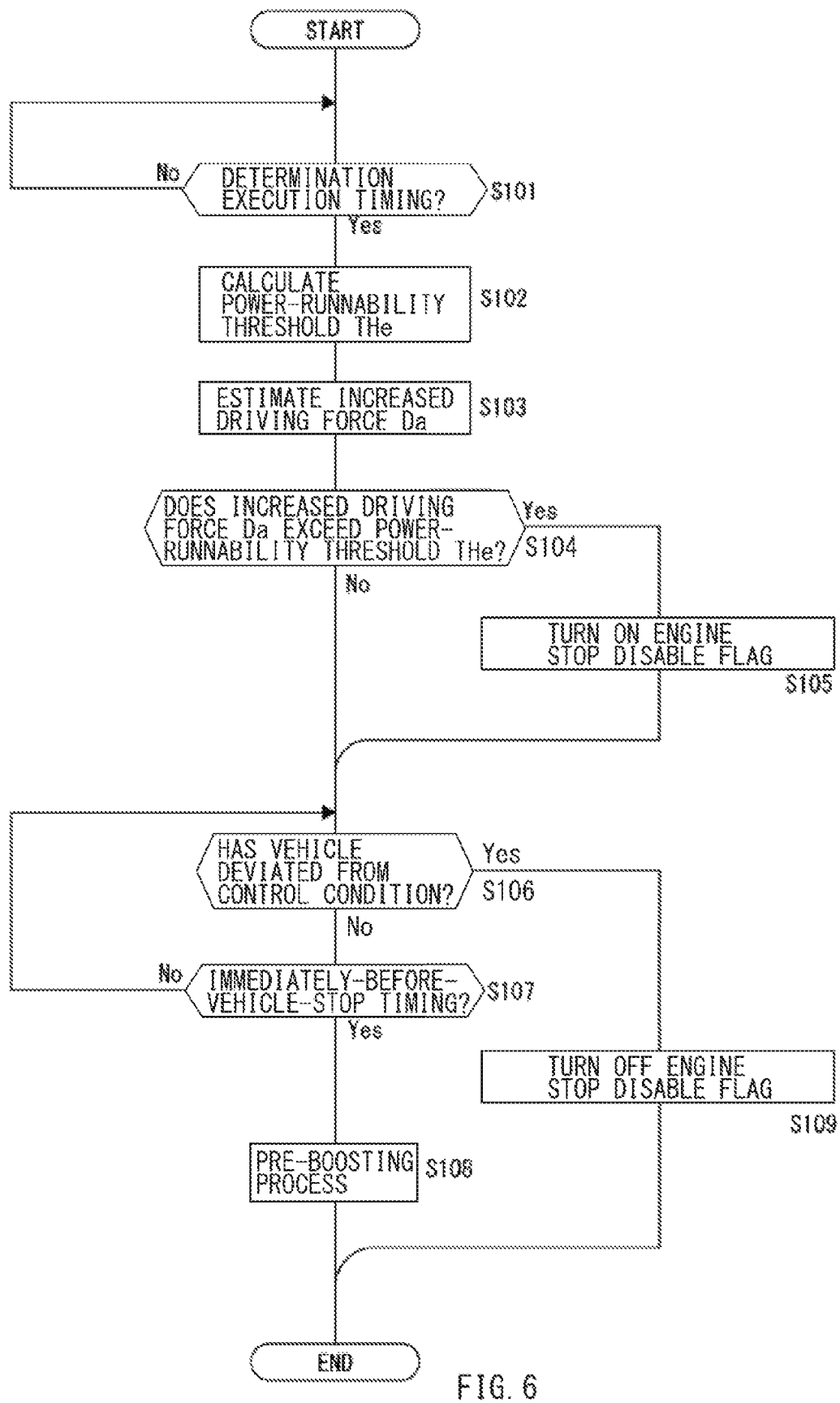
FIG. 6 is a flowchart illustrating an example of a detailed process procedure to be executed to implement the vehicle stop control according to one example embodiment.

The flowchart of FIG. 6 illustrates the example of the process procedure to be executed for the pre-boosting process and the engine restart prevention control by the processor 23 of the driving assistance control unit 2.

First, the processor 23 may wait until a determination execution timing arrives in step S101. In one example, the processor 23 may wait until arrival of a timing at which whether the increased driving force Da is coverable by the MG 10 is to be determined. As described above, whether the determination execution timing has arrived may be determined by determining whether the accelerator is off and the vehicle speed has become the third threshold TH3 or less.

If the determination execution timing has arrived (S101: Yes), the processor 23 may calculate the power-runnability threshold THe in step S102. The method of calculating the power-runnability threshold THe has been already described and redundant description will be avoided.

In step S103 following step S102, the processor 23 may perform a process of estimating the increased driving force Da. The method of estimating the increased driving force Da has also been already described and redundant description will be avoided.

In step S104 following step S103, the processor 23 may determine whether the increased driving force Da exceeds the power-runnability threshold THe. If the increased driving force Da is greater than the power-runnability threshold THe (S104: Yes), the processor 23 may turn ON an engine stop disable flag in step S105, and thereafter cause the process to proceed to step S106.

The engine stop disable flag may be a flag indicating whether the engine stop is disabled, ON representing a state in which the engine stop is disabled and OFF representing a state in which the engine stop is not disabled.

In this example, the engine stop disable flag may be a flag for the HEV control unit 3, and the HEV control unit 3 may refer to the engine stop disable flag at a time of engine stop control.

If the increased driving force Da is not greater than the power-runnability threshold THe in step S104 (S104: No), the processor 23 may cause the process to skip step S105 and proceed to step S106.

In step S106, the processor 23 may determine whether the vehicle has deviated from a control condition. The deviation from the control condition may refer to deviation from a condition under which the vehicle stop control is to be performed. In one example, whether the vehicle has deviated from the control condition may be determined by, for example, determining whether the vehicle has turned to an acceleration state instead of the deceleration state (e.g., whether the vehicle speed has begun to increase).

In a case where the vehicle turns to the acceleration state and is determined as having deviated from the control condition (S106: Yes), the processor 23 may turn OFF the engine stop disable flag in step S109, and thereafter end the series of processes illustrated in FIG. 6.

In a case where the vehicle is determined as not having deviated from the control condition in step S106 (S106: No), the processor 23 may determine whether the immediately-before-vehicle-stop timing has arrived in step S107. For example, the processor 23 may determine whether the accelerator is off and the vehicle speed is the second threshold TH2 or less. If the immediately-before-vehicle-stop timing has not arrived (S107: No), the processor 23 may cause the process to return to step S106. The processes in step S106 and step S107 may configure loop processing of waiting for either of the deviation from the control condition and the arrival of the immediately-before-vehicle-stop timing.

If the immediately-before-vehicle-stop timing has arrived in step S107 (S107: Yes), the processor 23 may cause the process to proceed to step S108 and perform the pre-boosting process. For example, the processor 23 may perform the process of increasing the requested brake fluid pressure to the stop holding fluid pressure Tp or greater. In the pre-boosting process, the state in which the requested brake fluid pressure has thus been increased to the stop holding fluid pressure Tp or greater may be kept until the vehicle stop timing. Note that, as described above, in a case where the process of increasing the requested brake fluid pressure is performed as the pre-boosting process, the processor 23 may perform, for agreement with the target driving force, the process of increasing the requested driving force to cancel out the amount of increase in the requested brake fluid pressure.

The processor 23 may end the series of processes illustrated in FIG. 6 after executing the pre-boosting process in step S108.

Figure 7:
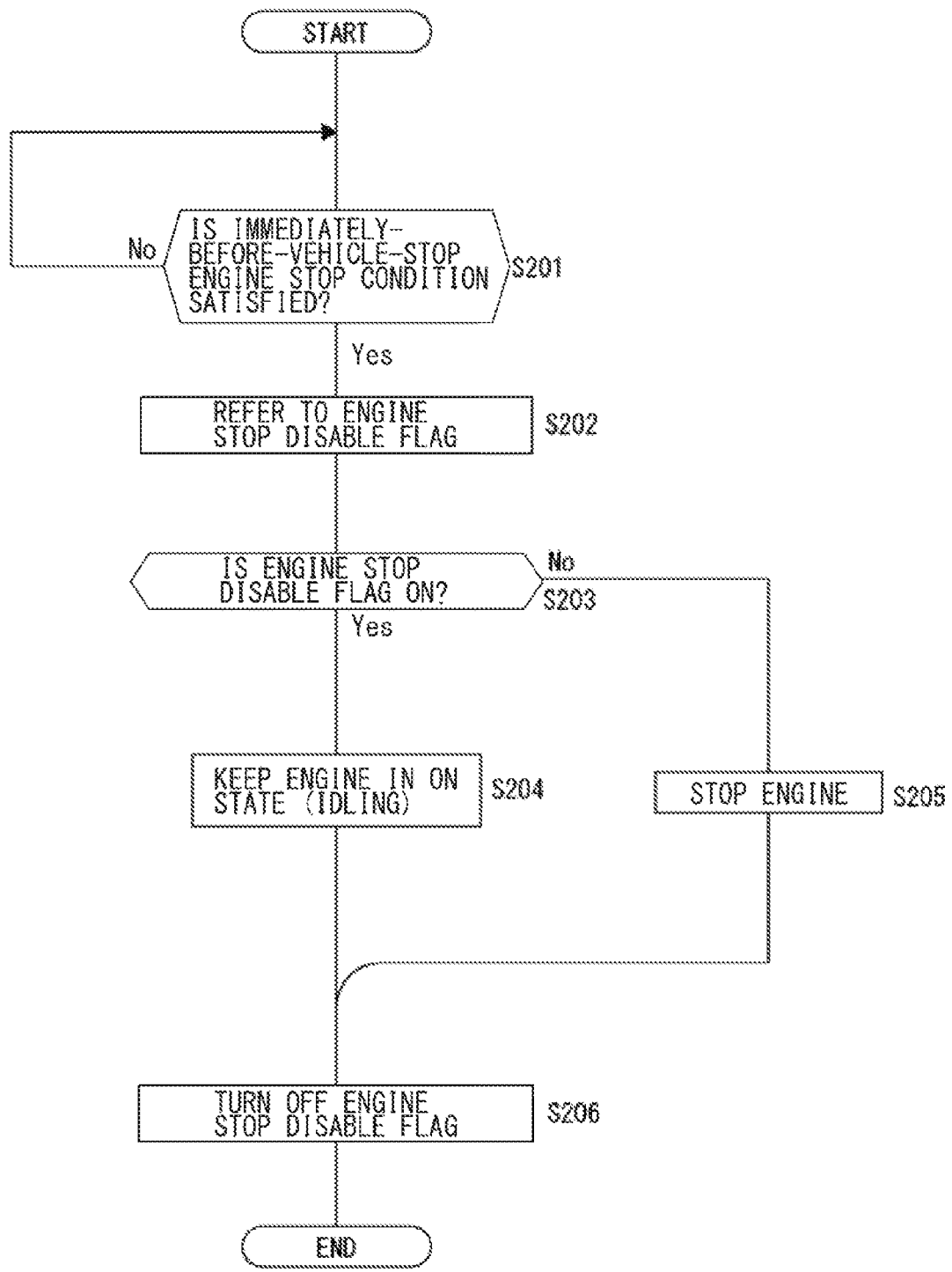
FIG. 7 is a flowchart illustrating the example of the detailed process procedure to be executed to implement the vehicle stop control according to one example embodiment.

The flowchart of FIG. 7 illustrates the process to be executed by the HEV control unit 3 for the engine restart prevention control.

First, the HEV control unit 3 may wait until an immediately-before-vehicle-stop engine stop condition is satisfied in step S201. For example, the HEV control unit 3 may wait until the engine requested driving force becomes 0 in the course of the requested driving force decreasing toward a stop of the vehicle.

In a case where the immediately-before-vehicle-stop engine stop condition is satisfied in step S201 (S201: Yes), the HEV control unit 3 may refer to the engine stop disable flag in step S202, and determine whether the engine stop disable flag is ON in step S203 following step S202.

If the engine stop disable flag is ON (S203: Yes), the HEV control unit 3 may perform a process for keeping of the engine in an ON state in step S204. For example, the HEV control unit 3 may instruct the engine control unit 4 to keep the engine in an idling state.

If the engine stop disable flag is not ON (S203: No), the HEV control unit 3 may instruct the engine control unit 4 to stop the engine, as an engine stop process in step S205.

In each of the case where the process in step S204 is executed and the case where the process in step S205 is executed, the HEV control unit 3 may cause the process to proceed to step S206, turn OFF the engine stop disable flag, and end the series of processes illustrated in FIG. 7.

The above description describes an example in which the determination execution timing related to the engine restart prevention control (the timing at which whether the increased driving force Da is coverable by the MG 10 is to be determined) is the timing at which the condition of "the accelerator is off and the vehicle speed is the third threshold TH3 or less" is satisfied. Alternatively, the determination execution timing may be another timing, such as a timing at which the requested driving force becomes the power-runnability threshold THe or less, or a deceleration start timing.

Figure 8:
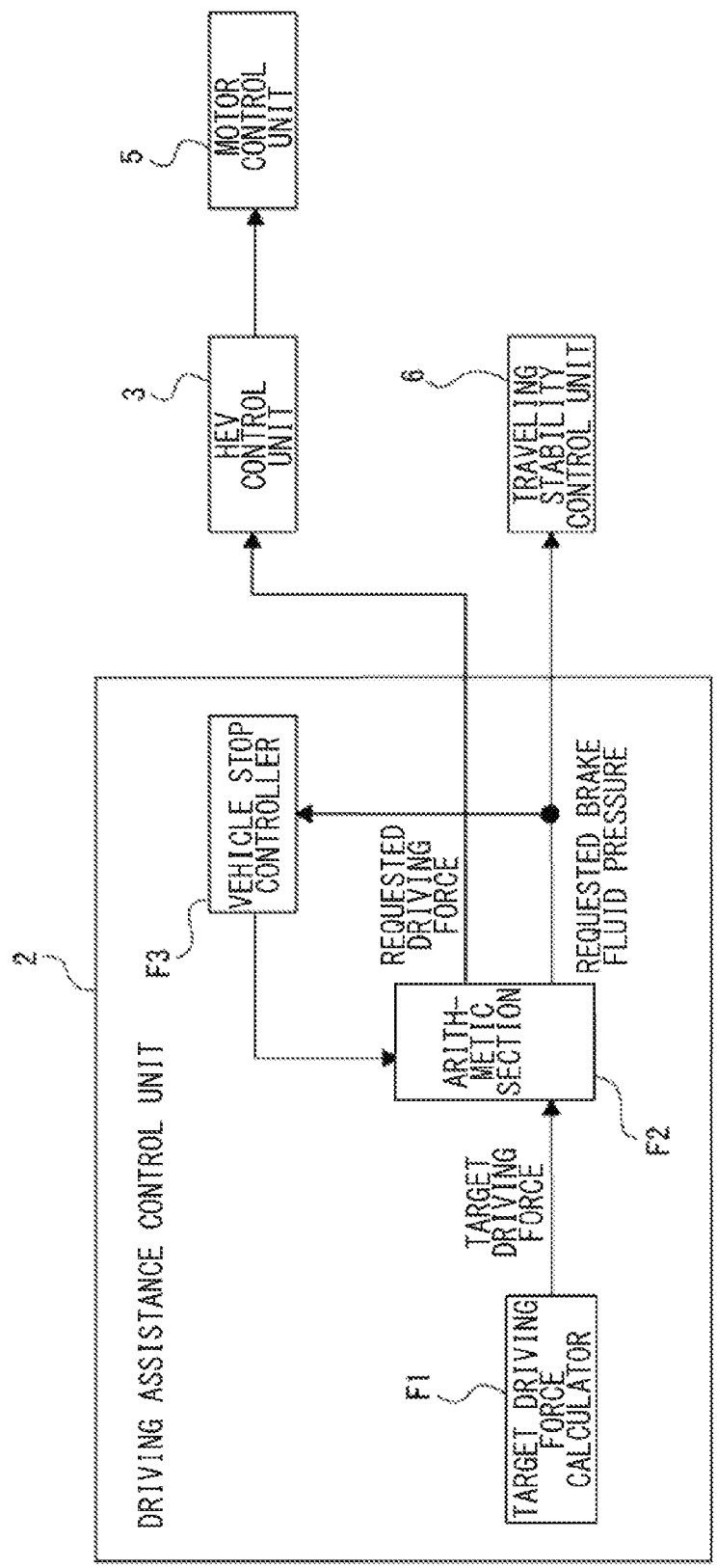
FIG. 8 is a schematic block diagram related to an entity that executes the vehicle stop control and corresponding to the configuration illustrated in FIG. 1.

The above description describes, as illustrated in a schematic block diagram of FIG. 8, an example in which the vehicle stop controller F3 that performs the pre-boosting process is provided in the driving assistance control unit 2. Alternatively, as illustrated as examples in FIG. 9 to FIG. 13, the vehicle stop controller F3 may be provided in the HEV control unit 3, the traveling stability control unit 6, or the motor control unit 5.

In the configuration illustrated in FIG. 8, the arithmetic section F2 that calculates the requested driving force and the requested brake fluid pressure on the basis of the target driving force calculated by the target driving force calculator F1 may also be provided in the driving assistance control unit 2 (the processor 23). In a case where the requested brake fluid pressure is increased by the vehicle stop controller F3, the arithmetic section F2 may calculate the requested driving force on the basis of the increased requested brake fluid pressure and the target driving force.

Figure 9:
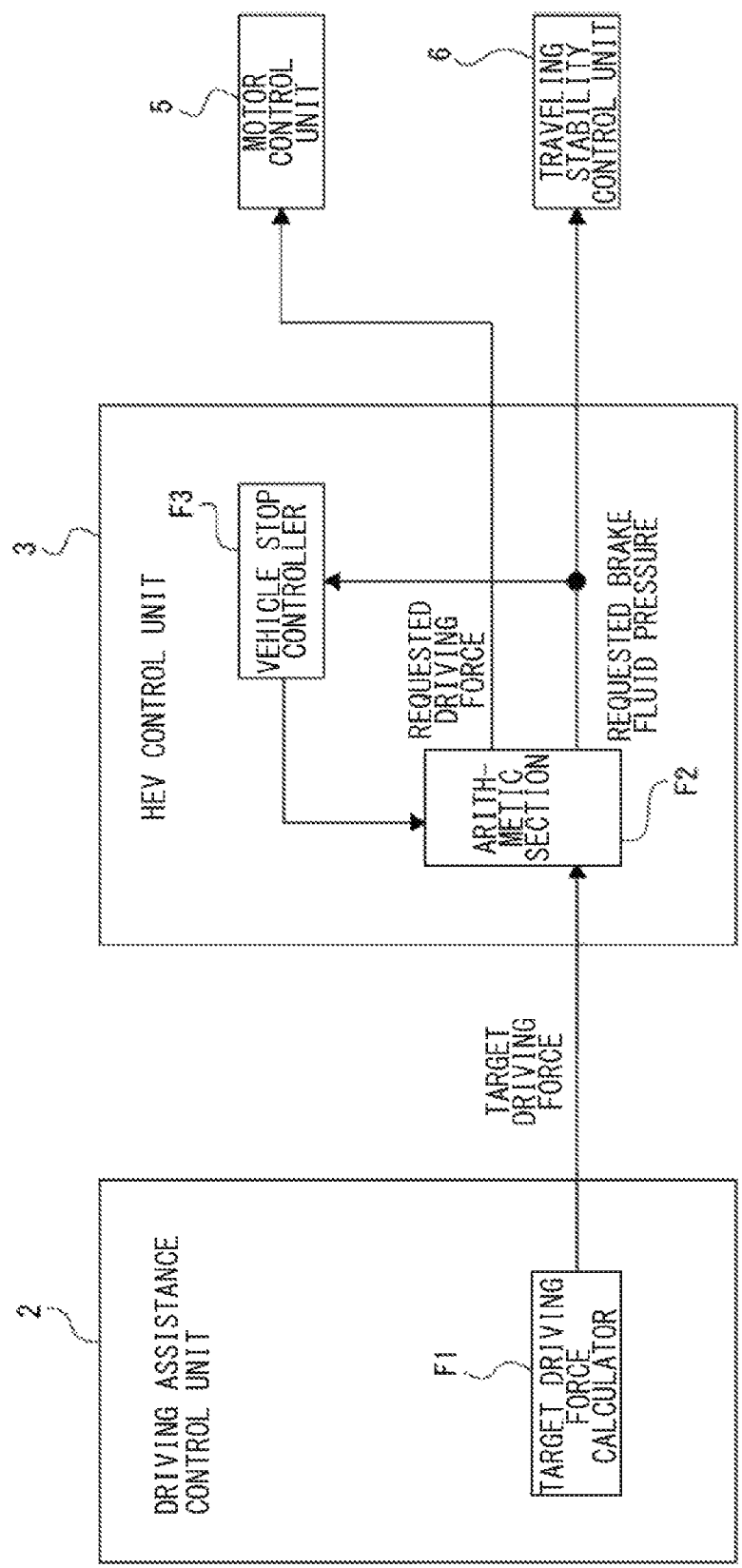
FIG. 9 is a schematic block diagram illustrating an example in which a vehicle stop controller according to one example embodiment is provided in an HEV control unit.
Figure 10:
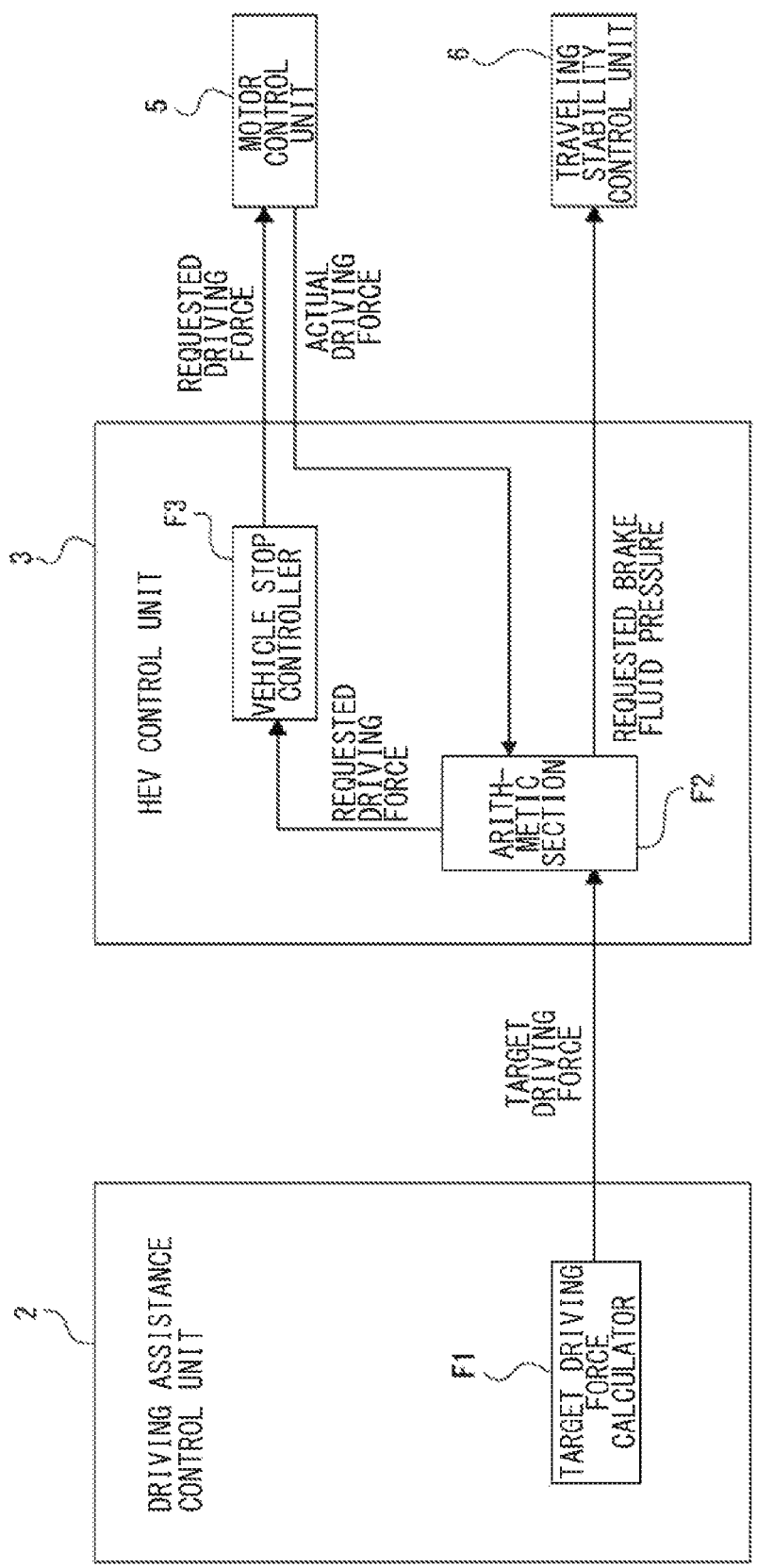
FIG. 10 is a schematic block diagram illustrating another example in which the vehicle stop controller according to one example embodiment is provided in the HEV control unit.

FIG. 9 and FIG. 10 each illustrate an example in which the vehicle stop controller F3 is provided in the HEV control unit 3.

In both cases of FIG. 9 and FIG. 10, the arithmetic section F2 may be provided in the HEV control unit 3, and may calculate the requested driving force and the requested brake fluid pressure on the basis of the target driving force inputted from the target driving force calculator F1 provided in the driving assistance control unit 2.

In the configuration illustrated in FIG. 9, in a case where the requested brake fluid pressure is increased by the vehicle stop controller F3, the arithmetic section F2 may calculate the requested driving force on the basis of the increased requested brake fluid pressure and the target driving force.

The configuration illustrated in FIG. 10 may be a configuration corresponding to a case of performing, as the pre-boosting process, a process of making the brake fluid pressure equal to or greater than the stop holding fluid pressure Tp by increasing the requested driving force instead of the requested brake fluid pressure. Note that, in this case, a degree to which the requested driving force is to be increased to make the brake fluid pressure equal to or greater than the stop holding fluid pressure Tp may be determined on the basis of, for example, the above-described profile of the target driving force.

In this case of FIG. 10, in a case where the requested driving force is increased by the vehicle stop controller F3, the arithmetic section F2 may calculate the requested brake fluid pressure on the basis of an actual driving force inputted from the motor control unit 5 and the target driving force. In this case, the requested brake fluid pressure may be calculated as a value expressed by "the target driving force−the actual driving force". The actual driving force may be an estimate of the actually generated driving force based on a drive current value of the MG 10.

Figure 11:
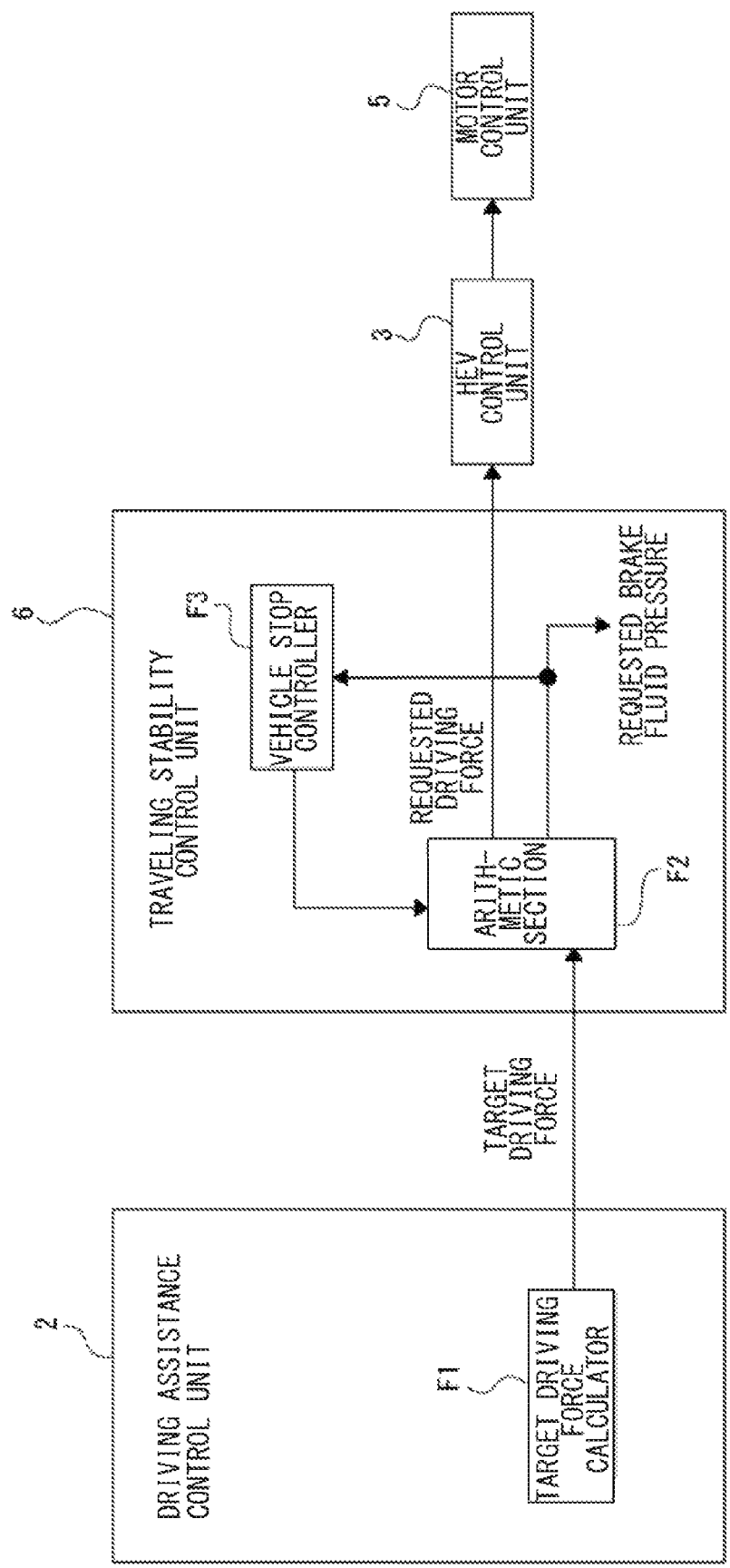
FIG. 11 is a schematic block diagram illustrating an example in which the vehicle stop controller according to one example embodiment is provided in a traveling stability control unit.
Figure 12:
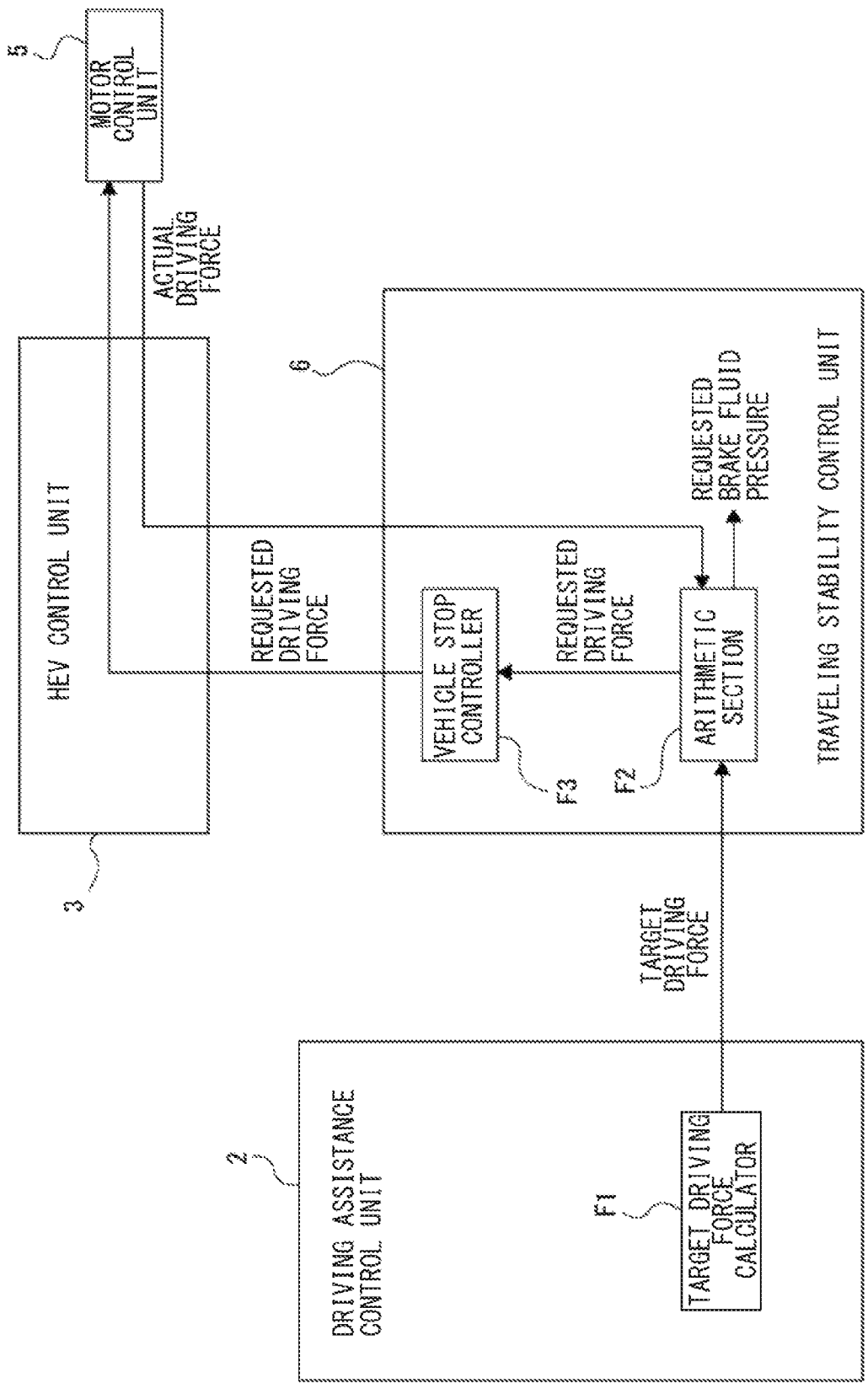
FIG. 12 is a schematic block diagram illustrating another example in which the vehicle stop controller according to one example embodiment is provided in the traveling stability control unit.

FIG. 11 and FIG. 12 each illustrate an example in which the vehicle stop controller F3 is provided in the traveling stability control unit 6.

In both cases of FIG. 11 and FIG. 12, the arithmetic section F2 may be provided in the traveling stability control unit 6, and may calculate the requested driving force and the requested brake fluid pressure on the basis of the target driving force inputted from the target driving force calculator F1 provided in the driving assistance control unit 2.

In the configuration illustrated in FIG. 11, in a case where the requested brake fluid pressure is increased by the vehicle stop controller F3, the arithmetic section F2 may calculate the requested driving force on the basis of the increased requested brake fluid pressure and the target driving force.

The configuration illustrated in FIG. 12 may be, as with the case of FIG. 10, a configuration assuming that the requested driving force is increased instead of the requested brake fluid pressure, as the pre-boosting process. In this configuration illustrated in FIG. 12, in a case where the requested driving force is increased by the vehicle stop controller F3, the arithmetic section F2 may calculate the requested brake fluid pressure, on the basis of the actual driving force inputted from the motor control unit 5 via the HEV control unit 3 and the target driving force. Also in this case, the requested brake fluid pressure may be calculated as a value expressed by "the target driving force–the actual driving force".

Figure 13:
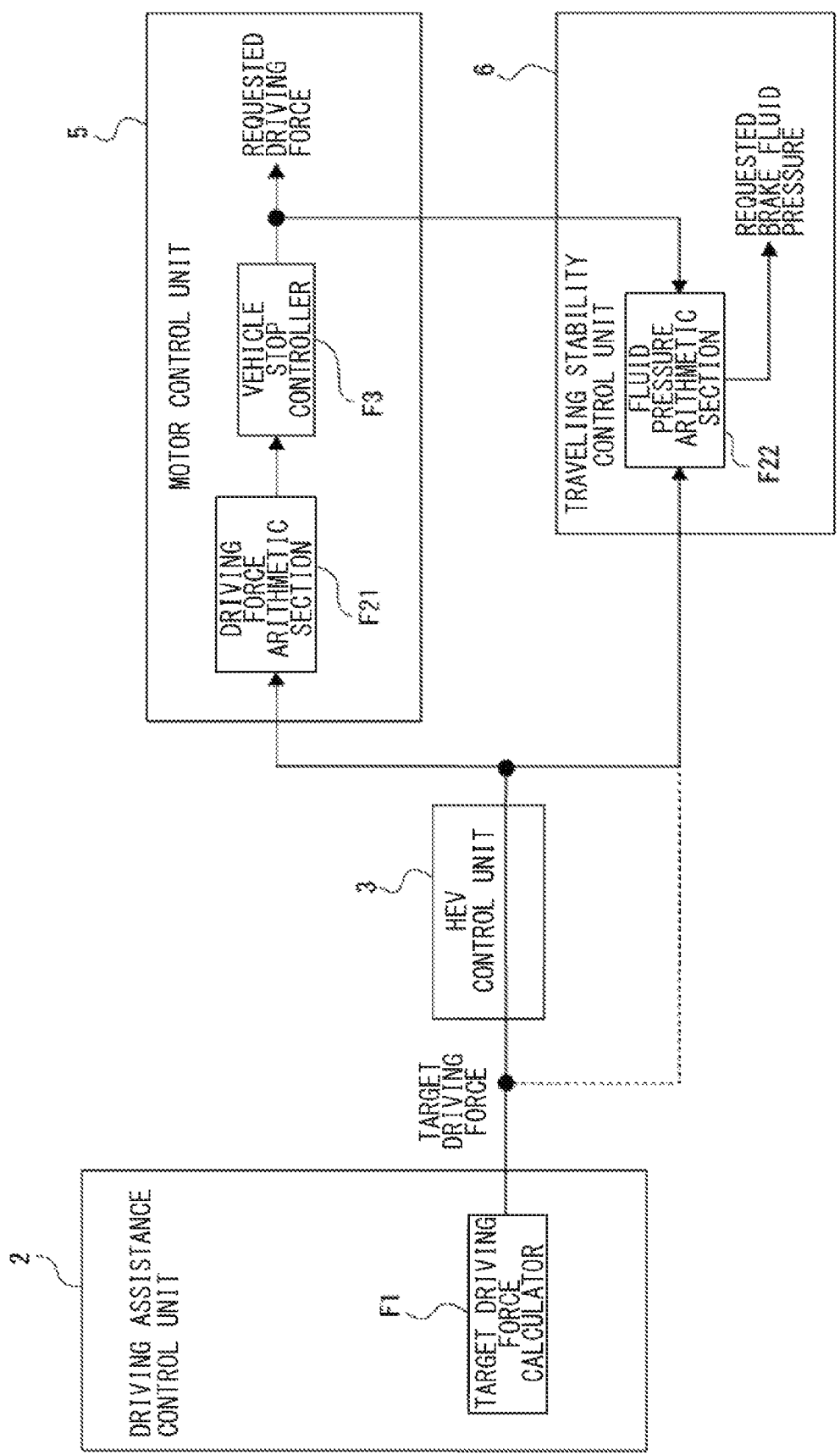
FIG. 13 is a schematic block diagram illustrating an example in which the vehicle stop controller according to one example embodiment is provided in a motor control unit.

FIG. 13 illustrates an example in which the vehicle stop controller F3 is provided in the motor control unit 5.

The configuration illustrated in FIG. 13 may also be, as with the case of FIG. 10, a configuration assuming that the requested driving force is increased instead of the requested brake fluid pressure, as the pre-boosting process. In this case, the target driving force calculated by the target driving force calculator F1 of the driving assistance control unit 2 may be inputted to the HEV control unit 3, and the HEV control unit 3 may output the target driving force to the motor control unit 5 and the traveling stability control unit 6.

The motor control unit 5 may be provided with a driving force arithmetic section F21 that calculates the requested driving force on the basis of the target driving force. The traveling stability control unit 6 may be provided with a fluid pressure arithmetic section F22 that calculates the requested brake fluid pressure on the basis of the target driving force, and the requested driving force inputted from the motor control unit 5.

In a case where the requested driving force is increased by the vehicle stop controller F3 in the motor control unit 5, the increased requested driving force may be inputted to the fluid pressure arithmetic section F22. Therefore, in a case where the pre-boosting process is performed, it is possible to increase the brake fluid pressure to the stop holding fluid pressure Tp or greater. The fluid pressure arithmetic section F22 may calculate, as the requested brake fluid pressure, a value expressed by "the target driving force–the requested driving force".

In the configuration illustrated in FIG. 13, the fluid pressure arithmetic section F22 may be configured to acquire the actual driving force from the motor control unit 5, and calculate the requested brake fluid pressure on the basis of the actual driving force and the target driving force.

The configuration illustrated in FIG. 13 may represent an example in which the target driving force is supplied to the motor control unit 5 and the traveling stability control unit 6 via the HEV control unit 3. In another example, as indicated by a dashed line in FIG. 13, the target driving force may be supplied to the motor control unit 5 via the HEV control unit 3, and the target driving force may be supplied to the traveling stability control unit 6 from the driving assistance control unit 2 without passing through the HEV control unit 3.

The example embodiment is not limited to the examples described above, and may include various modification examples.

For example, although the stop holding fluid pressure Tp may be assumed to be a fixed value in the above description, the stop holding fluid pressure Tp may be a variable value corresponding to the gradient, for example.

The above description describes an example in which whether the increase in the requested driving force to be caused by the pre-boosting process is coverable by the motor generator is predicted by the prediction method using the power-runnability threshold THe and the increased driving force Da. In another example, the prediction may be performed on the basis of only the power-runnability threshold THe. In one example, whether the power-runnability threshold THe is equal to or greater than a predetermined threshold may be determined. In a case where the stop holding fluid pressure Tp is a variable value corresponding to the gradient, the threshold may similarly be a variable value corresponding to the gradient.

The power-runnability threshold THe may be obtained from the amount of regeneration caused by the regenerative running performed before the vehicle stops and the remaining amount of the traveling battery, as described above. Therefore, the prediction may be performed on the basis of only the remaining amount of the traveling battery in place of the power-runnability threshold THe, or the prediction may be performed on the basis of the remaining amount of the traveling battery and the amount of regeneration. Alternatively, the prediction may be performed on the basis of the battery output and the output of the MG 10, as a matter of course.

Although not mentioned above, in a case where the engine stop is disabled by the engine restart prevention control and the immediately-before-vehicle-stop timing arrives, the engine stop may be enabled if it becomes possible to cancel out the amount of increase in the fluid pressure for keeping of the stop holding fluid pressure Tp by only the driving force of the MG 10.

The above description describes an example of applying the pre-boosting process and the engine restart prevention control according to the example embodiment in relation to stopping of the vehicle during the ACC. In another example, the pre-boosting process and the engine restart prevention control may be applied in relation to stopping of the vehicle by an automatic driving technique or stopping of the vehicle based on a one-pedal function. The one-pedal function may refer to a function of causing a vehicle to accelerate and decelerate on the basis of operations performed on one pedal.

Although the above description describes, as an example, the case of applying the pre-boosting process according to the example embodiment to an HEV, it is also possible to apply the pre-boosting process according to the example embodiment to an electric vehicle (EV).

As described above, the vehicle control system (vehicle control system 1) according to the example embodiment is a vehicle control system for a vehicle. The vehicle is provided with a motor generator as a wheel drive source and has the stop holding function of, in a case where the vehicle-stop brake fluid pressure that is the brake fluid pressure at the vehicle stop timing is not equal to or greater than the predetermined stop holding fluid pressure, performing stop holding by increasing the brake fluid pressure to the stop holding fluid pressure or greater. The vehicle control system includes the target driving force calculator (target driving force calculator F1), the arithmetic section (arithmetic section F2), and the vehicle stop controller (vehicle stop controller F3). The target driving force calculator calculates the target driving force for the vehicle. The arithmetic section calculates, on the basis of the target driving force, the requested driving force to be used for drive control of the motor generator and the requested brake fluid pressure to be used for brake control. The vehicle stop controller performs, at the immediately-before-vehicle-stop timing that is the timing immediately before the vehicle stop timing, the pre-boosting process of increasing the brake fluid pressure to the stop holding fluid pressure or greater.

Performing the pre-boosting process described above makes it possible to prevent the brake fluid pressure at the vehicle stop timing from decreasing to less than the stop holding fluid pressure. It is thus possible to prevent the brake fluid pressure from being boosted from less than the stop holding fluid pressure to the stop holding fluid pressure or greater by the stop holding function.

This helps to reduce the user's feeling of strangeness in achieving stop holding.

In the vehicle control system according to some example embodiments, as the pre-boosting process, the vehicle stop controller may perform the process of increasing the requested brake fluid pressure to the stop holding fluid pressure or greater and increasing the requested driving force to satisfy the target driving force.

This enables the driving force to be increased to cancel out the amount of increase in the brake fluid pressure at the immediately-before-vehicle-stop timing.

This makes it possible to prevent deceleration more than necessary from being performed in a period from the immediately-before-vehicle-stop timing to the vehicle stop timing, which helps to cause the vehicle to stop at an appropriate stop position.

In the vehicle control system according to some example embodiments, in the pre-boosting process, the vehicle stop controller may keep the requested brake fluid pressure at the stop holding fluid pressure or greater in a period from the immediately-before-vehicle-stop timing to the vehicle stop timing (see step S108 in FIG. 6).

This makes it possible to more reliably prevent the brake fluid pressure at the vehicle stop timing from decreasing to less than the stop holding fluid pressure.

It is thus possible to more reliably prevent the brake fluid pressure from being boosted from less than the stop holding fluid pressure to the stop holding fluid pressure or greater by the stop holding function.

In the vehicle control system according to some example embodiments, the vehicle may be a hybrid electric vehicle provided with the motor generator and an engine as wheel drive sources. At a timing prior to the immediately-before-vehicle-stop timing, the vehicle stop controller may perform prediction of whether the increase in the requested driving force to be caused by the pre-boosting process is coverable by the motor generator. The vehicle stop controller may perform the engine stop disable control of disabling the stop of the engine in a case where the increase in the requested driving force is predicted as not being coverable.

In a case where the increase in the requested driving force to be caused by the pre-boosting process is not coverable by the motor generator, the stop of the engine may be disabled as described above, because the shortage is to be covered by the engine.

Thus, in a case where the requested driving force for canceling out of the amount of increase in the brake fluid pressure is not coverable by the motor generator, due to the influence of the remaining amount of the traveling battery, for example, it is possible to prevent the engine from being restarted after being stopped when the vehicle is about to stop. It is thus possible to prevent such engine restart at the time when the vehicle is about to stop from giving the user a feeling of strangeness.

In the vehicle control system according to some example embodiments, in the engine stop disable control, the vehicle stop controller may perform the prediction on the basis of the amount of regeneration of the motor generator caused by the regenerative running performed before the vehicle stops.

The prediction taking into consideration the amount of regeneration before the stop of the vehicle makes it possible to improve precision of the prediction as to whether the requested driving force to be increased by the pre-boosting process is coverable by the motor generator.

The improvement in precision of the prediction helps to achieve appropriate engine stop control when the vehicle stops.

In the vehicle control system according to some example embodiments, the target driving force calculator may calculate the target driving force for preceding-vehicle-following vehicle speed control.

Thus, in a case where the vehicle is caused to automatically stop by the preceding-vehicle-following vehicle speed control, it is possible to prevent the brake fluid pressure from being boosted after being once reduced by the stop holding function.

This makes it possible to, in a case where the vehicle is caused to automatically stop by the preceding-vehicle-following vehicle speed control, reduce the user's feeling of strangeness in achieving the stop holding.

In the vehicle control system according to some example embodiments, the stop holding function may include keeping the brake fluid pressure at the vehicle-stop brake fluid pressure in a case where the vehicle-stop brake fluid pressure is equal to or greater than the stop holding fluid pressure.

In the stop holding function, in a case where the vehicle-stop brake fluid pressure greatly exceeds the stop holding fluid pressure, the brake fluid pressure may be reduced to approach the stop holding fluid pressure. In that case, however, operating sound produced in reducing the brake fluid pressure can give the user a feeling of strangeness. It is possible to prevent a feeling of strangeness due to such operating sound from being given to the user if the vehicle-stop brake fluid pressure that is equal to or greater than the stop holding fluid pressure is kept as it is as described above.

This makes it possible to reduce the user's feeling of strangeness in achieving the stop holding.

If the vehicle-stop brake fluid pressure that is equal to or greater than the stop holding fluid pressure is kept as it is as described above, it is also possible to enhance reliability of the stop holding.

Each of the target driving force calculator F1, the arithmetic section F2, and the vehicle stop controller F3 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the target driving force calculator F1, the arithmetic section F2, and the vehicle stop controller F3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the target driving force calculator F1, the arithmetic section F2, and the vehicle stop controller F3 illustrated in FIG. 3.

Although some example embodiments and modification examples of the technology are described hereinabove, the foregoing embodiments and modification examples are mere examples and are not intended to limit the scope of the technology. It should be also appreciated that various omissions, replacements, and modifications may be made in the foregoing embodiments and modification examples described herein, without departing from the scope of the technology. The technology is intended to include such modifications and alterations in so far as they fall within the scope of the appended claims or the equivalents thereof.

The invention claimed is:

1. A vehicle control system for a vehicle, the vehicle control system comprising at least one machine readable medium storing instructions and at least one processor configured to execute the instructions to:
   calculate a target driving force for the vehicle, the vehicle being provided with a motor generator as a wheel drive source and having a stop holding function of, in a case where a vehicle-stop brake fluid pressure that is a brake fluid pressure at a vehicle stop timing is less than a predetermined stop holding fluid pressure that is a brake fluid pressure necessary for holding of the vehicle in a stopped state, boosting the vehicle-stop brake fluid pressure to the predetermined stop holding fluid pressure or greater to hold the vehicle in stopped state,
   calculate, based on the target driving force, a requested driving force to be used for drive control of the motor generator and a requested brake fluid pressure to be used for brake control,
   execute, based on determining that an accelerator of the vehicle is off and a speed of the vehicle is equal to or less than a first threshold, an engine control process comprising:
      estimating an amount of regeneration of the motor generator caused by regenerative running performed before the vehicle stops;
      estimating, based on the estimated amount of regeneration of the motor generator, a remaining amount of a battery configured to be a power source of the motor generator at a time point that a pre-boosting process starts;
      determining, based on the estimated remaining amount of the battery, a power-runnability threshold;
      performing a prediction of whether the requested driving force to be increased during the pre-boosting process can be covered by only the motor generator among the motor generator and an engine based on the determined power-runnability threshold;
      prohibiting, based on determining that the requested driving force to be increased cannot be covered by only the motor generator, a stop of the engine of the vehicle so that a speed of the engine is kept greater than zero at least until the speed of the vehicle becomes zero; and
      executing, based on determining that the requested driving force to be increased can be covered by only the motor generator, the stop of the engine of the vehicle, and
   execute, based on determining that (i) the accelerator of the vehicle is off, (ii) the speed of the vehicle is equal to or less than a second threshold that is less than the first threshold, and (iii) the requested driving force to be increased can be covered by only the motor generator, the pre-boosting process comprising:
      increasing the brake fluid pressure to the predetermined stop holding fluid pressure or greater and increasing the requested driving force to satisfy the target driving force, wherein the requested driving force is increased to cancel out an amount of increase in the requested brake fluid pressure during the pre-boosting process.

2. The vehicle control system according to claim 1, wherein the at least one processor is configured to execute the instructions to keep, in the pre-boosting process, the requested brake fluid pressure at the predetermined stop holding fluid pressure or greater in a period from when determining that (i) the accelerator of the vehicle is off, and (ii) the speed of the vehicle is equal to or less than the second threshold to the vehicle stop timing.

3. The vehicle control system according to claim 1, wherein the at least one processor is configured to execute the instructions to calculate the target driving force for vehicle speed control to follow a preceding-vehicle.

4. The vehicle control system according to claim 2, wherein the at least one processor is configured to execute the instructions to calculate the target driving force for vehicle speed control to follow a preceding-vehicle.

5. The vehicle control system according to claim 1, wherein the stop holding function includes keeping the brake fluid pressure at the vehicle-stop brake fluid pressure in a case where the vehicle-stop brake fluid pressure is equal to or greater than the predetermined stop holding fluid pressure.

6. The vehicle control system according to claim 2, wherein the stop holding function includes keeping the brake fluid pressure at the vehicle-stop brake fluid pressure in a case where the vehicle-stop brake fluid pressure is equal to or greater than the predetermined stop holding fluid pressure.

7. A vehicle control system for a vehicle, the vehicle control system comprising circuitry configured to
   calculate a target driving force for the vehicle, the vehicle being provided with a motor generator as a wheel drive source and having a stop holding function of, in a case where a vehicle-stop brake fluid pressure that is a brake fluid pressure at a vehicle stop timing is less than a predetermined stop holding fluid pressure that is a brake fluid pressure necessary for holding of the vehicle in a stopped state, boosting the vehicle-stop brake fluid pressure to the predetermined stop holding fluid pressure or greater to hold the vehicle in the stopped state,
   calculate, based on the target driving force, a requested driving force to be used for drive control of the motor generator and a requested brake fluid pressure to be used for brake control,
   execute, based on determining that an accelerator of the vehicle is off and a speed of the vehicle is equal to or less than a first threshold, an engine control process comprising:

estimating an amount of regeneration of the motor generator caused by regenerative running performed before the vehicle stops;

estimating, based on the estimated amount of regeneration of the motor generator, a remaining amount of a battery configured to be a power source of the motor generator at a time point that a pre-boosting process starts;

determining, based on the estimated remaining amount of the battery, a power-runnability threshold;

performing, a prediction of whether the requested driving force to be increased during the pre-boosting process can be covered by only the motor generator among the motor generator and an engine based on the determined power-runnability threshold;

prohibiting, based on determining that the requested driving force to be increased cannot be covered by only the motor generator, a stop of the engine of the vehicle so that a speed of the engine is kept greater than zero at least until the speed of the vehicle becomes zero; and executing, based on determining that the requested driving force to be increased can be covered by only the motor generator, the stop of the engine of the vehicle, and execute, based on determining that (i) the accelerator of the vehicle is off, (ii) the speed of the vehicle is equal to or less than a second threshold that is less than the first threshold (iii) the requested driving force to be increased can be covered by only the motor generator, the pre-boosting process comprising:

increasing the brake fluid pressure to the predetermined stop holding fluid pressure or greater and increasing the requested driving force to satisfy the target driving force, wherein the requested driving force is increased to cancel out an amount of increase in the requested brake fluid pressure during the pre-boosting process.

8. The vehicle control system according to claim 1, wherein the at least one processor is configured to execute the instructions to perform a regeneration braking in a case where the requested driving force is a negative value before the pre-boosting process.

9. The vehicle control system according to claim 1, wherein the at least one processor is configured to execute the instructions to reduce the requested driving force toward zero after the vehicle stop timing.

10. The vehicle control system according to claim 7, wherein the circuitry is further configured to perform a regeneration braking in a case where the requested driving force is a negative value before the pre-boosting process.

11. The vehicle control system according to claim 7, wherein the circuitry is further configured to reduce the requested driving force toward zero after the vehicle stop timing.

12. The vehicle control system according to claim 1, wherein the predetermined stop holding fluid pressure indicates a lower limit value of the brake fluid pressure for holding of the vehicle in the stopped state or is a value including a margin in addition to the lower limit value.

13. The vehicle control system according to claim 7, wherein the predetermined stop holding fluid pressure indicates a lower limit value of the brake fluid pressure for holding of the vehicle in the stopped state or is a value including a margin in addition to the lower limit value.

14. The vehicle control system according to claim 1, wherein the power-runnability threshold is determined based on an output of the motor generator and an output of the battery.

15. The vehicle control system according to claim 14, wherein the output of the motor generator is determined based on a temperature of an inverter of the motor generator.

16. The vehicle control system according to claim 14, wherein the output of the battery is determined based on a temperature and a degree of deterioration of the battery.

17. The vehicle control system according to claim 7, wherein the power-runnability threshold is determined based on an output of the motor generator and an output of the battery.

18. The vehicle control system according to claim 17, wherein the output of the motor generator is determined based on a temperature of an inverter of the motor generator.

19. The vehicle control system according to claim 17, wherein the output of the battery is determined based on a temperature and a degree of deterioration of the battery.

* * * * *